United States Patent [19]

Kraus

[11] Patent Number: 4,618,270
[45] Date of Patent: Oct. 21, 1986

[54] HYDROSTATIC BEARING STRUCTURE

[75] Inventor: Charles E. Kraus, Austin, Tex.

[73] Assignee: Excelermatic Inc., Austin, Tex.

[21] Appl. No.: 708,029

[22] Filed: Mar. 4, 1985

[51] Int. Cl.[4] .................. F16C 17/00; F16C 27/02
[52] U.S. Cl. .................... 384/114; 384/121; 384/124; 384/125
[58] Field of Search ............ 384/100, 99, 107, 114, 384/119, 121, 124, 125, 97, 98, 103, 105, 138, 151, 153, 130; 308/DIG. 8, DIG. 14

[56] References Cited

U.S. PATENT DOCUMENTS

| | | | |
|---|---|---|---|
| 2,397,124 | 3/1946 | Buffington et al. | 384/97 |
| 2,887,766 | 5/1959 | Fike et al. | 308/DIG. 8 X |
| 3,140,902 | 7/1964 | Herbst | 384/153 |
| 3,418,028 | 12/1968 | Watson et al. | 308/DIG. 8 X |
| 3,785,707 | 1/1974 | Mitsuoka | 384/121 |
| 3,993,371 | 11/1976 | Orndorff, Jr. | 384/303 X |

Primary Examiner—Stuart S. Levy
Assistant Examiner—David Werner

[57] ABSTRACT

In a hydrostatic bearing structure in which two bearing members are disposed for movement relative to one another with adjacent bearing surfaces adapted to accommodate therebetween a bearing fluid under pressure for supporting one of the members on the other, a bearing surface area of at least one of the members is formed by a thin layer of an elastomeric material on a substrate of a highly heat conductive material in order to avoid damage to the bearing surfaces by particular matter and friction heat.

10 Claims, 2 Drawing Figures

HYDROSTATIC BEARING STRUCTURE

BACKGROUND OF THE INVENTION

The invention relates to hydrostatic bearings especially high speed, high pressure hydrostatic bearings.

Hydrostatic bearings can carry relatively large loads, are relatively inexpensive and are relatively efficient. They are also quite accurate in positioning two relatively movable structures if the hydraulic bearing pad between the two relatively movable bearing structures is relatively thin or a bearing cavity seal is closely adjacent the structure to be sealed. A major problem, however, resides in wear and scratching of the harder element of the seal or other mating structural areas. It appears that hard abrasive particles are implanted into the softer of the two mating surface areas and, embedded therein, they lap and grind down the harder of the two surfaces. Even very fine filters such as 10 micron lubricant filters have been found to be ineffective in preventing surface scratching and wear.

It has been tried to use resilient plastics adapted to resiliently receive hard particles so as to prevent scratching of the opposite surfaces. They melted under the heat generated by the bearing structure. A layer of rubber on a cast iron support structure, for example, which has been found to be a good bearing structure for ship propeller shafts that are exposed to cold water, overheated rapidly under given speed, high load conditions.

SUMMARY OF THE INVENTION

It has been found that a thin layer of a lubricant and heat resistant elastomeric material disposed on a heat conductive support structure provides for excellent hydrostatic bearing structures. A thin layer of nitrile rubber on an aluminum base, for example, provides for a bearing structure which is not sensitive to scratching and wear nor to overheating.

It was found that small particles roll through the elastomeric material while being impressed therein sufficiently that the opposite surface does not experience scratching and wear and that the heat generated in such thin layer of elastomeric material is rapidly transmitted to the highly heat conductive base which, because of its high heat conductivity, remains relatively cold, thereby providing for a high temperature differential at the elastomeric material and base interface.

The elastomeric material may be, for example, nitrile rubber. It is preferably applied as a layer of not more than 1/32 inch of thickness onto a substrate of a heat conductive material such as aluminum or copper. Furthermore, the elastomeric material must be resistant to the lubricant utilized as the hydrostatic bearing fluid.

SHORT DESCRIPTION OF THE DRAWINGS

FIG. 1 is a cross-sectional view of an axial thrust bearing designed in accordance with the present invention; and FIG. 2 shows a shaft bearing incorporating the present invention.

DESCRIPTION OF THE PREFERRED EMBODIMENTS

Figure 1:
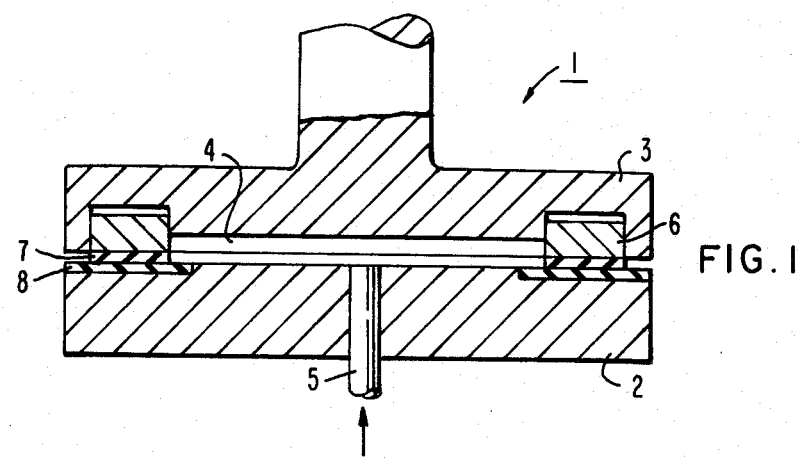

A bearing structure 1 comprises a body 2 having disposed thereon a runner 3 provided with a hydrostatic bearing cavity 4 to which pressurized fluid is supplied by means of a pressurized fluid supply line 5. A seal ring 6 is axially movably disposed around the hydrostatic bearing cavity with its surface closely adjacent the body 2 so as to prevent the escape of pressurized fluid from the bearing cavity 4.

The seal ring 6 consists of a heat conductive material such as aluminum or copper and has a face layer 7 of an elastomeric material disposed thereon. The face layer 7 is thin, generally not more than 1/32 of an inch thick in order to permit rapid removal of the heat generated at the sealing ring face.

The opposite body 2 may also be provided with a thin layer 8 of an elastomeric material and is then also composed of a material with good heat conductivity for good heat removal from the elastomeric material.

Figure 2:
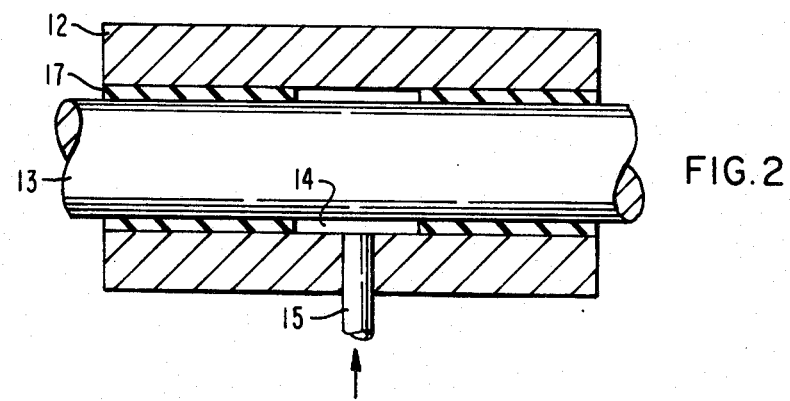

FIG. 2 shows the invention applied to a shaft bearing in which a shaft 13 is supported on a bearing housing 12. A bearing cavity 14 is formed in the bearing housing 12 and pressurized fluid is admitted to the bearing cavity 14 by means of a supply passage 15. The housing has at least a thin layer 17 of nitrile rubber disposed thereon for supporting the shaft with a film of the lubricant forming between the shaft and the nitrile rubber layer.

With the arrangement according to the invention, any particles carried along with the lubricant into the bearing structure are rolling through the elastomeric bearing layer by locally deforming but not cutting or scratching the elastomeric material surface. Nitrile rubber is lubricant resistant and therefore a preferred material, but other elastomeric materials with similar properties, for example, fluorocarbons, may be used. The elastomeric material may be disposed on a thin substrate 9 of copper, for example, which is disposed on a bearing support body 2.

A bearing tested with a bearing fluid pressure of 1000 psi and a seal ring surface relative speed of over 60 ft/second operated without a filter in the fluid circuit, including fluid which had caused heavy wear and scratching of a hard surface bearing, did not show any noticeable wear. A bearing structure having nitrile rubber on an aluminum seal ring and nitrile rubber on a hard steel substrate, serving as the opposite surface of the hydrostatic bearing and run under heavy load conditions, showed damage to the nitrile rubber surface on the steel substrate after some time apparently through overheating, no damage to the nitrile rubber layer on the aluminum seal ring. Replacement of the steel substrate structure by a bearing structure with aluminum substrate with all other conditions remaining unchanged has permitted the bearing to run to the end of the test without damage to either surface. This indicates that rapid heat removal is important. Under normal load, however, the steel base served quite well, as steel, also, has a relativey high heat conductivity. For the removal of heat from the seal surface, it is of prime importance that the elastomeric layer, which has a relatively low heat conductivity, is thin so that heat is removed more rapidly but it is also important that the base has good heat conductivity for carrying away the heat from the elastomeric material. The elastomeric material needs to be lubricant resistant, but it is also advantageous if it is heat resistant. In this respect, Teflon and Vyton made by DuPont are being found to be quite promising materials. However, other elastomeric compounds of good lubricant and heat resistance may be formulated as desired depending on the lubricant utilized and the heat load expected.

I claim:

1. A hydrostatic bearing structure comprising two bearing members disposed so as to be movable relative to one another and having adjacent one another bearing surfaces adapted to accommodate therebetween a bearing fluid under pressure for supporting one of said members on the other, the bearing surface of at least one of said members being formed by a thin layer of an elastomeric material disposed on a substrate of a highly heat conductive material, said layer of elastomeric material having a thickness of not more than 1/32 inch for rapid travel of heat generated at said bearing surface area into said substrate.

2. A hydrostatic bearing structure according to claim 1, wherein said substrate consists of aluminum.

3. A hydrostatic bearing structure according to claim 1, wherein said substrate consists of copper or a copper alloy.

4. A hydrostatic bearing structure according to claim 1, wherein said elastomeric material consists of nitrile rubber.

5. A hydrostatic bearing structure according to claim 1, wherein both of said bearing surfaces carry a layer of elastomeric material on a substrate of a heat conductive hard material.

6. A hydrostatic bearing structure according to claim 1, wherein a bearing cavity is formed between said bearing members and a seal ring surrounding said cavity is disposed in one of said members, said seal ring consisting of a hard heat conductive material and carrying on its face, adjacent the other of said bearing members, a thin layer of an elastomeric material.

7. A hydrostatic bearing structure according to claim 6, wherein the other members has adjacent said seal ring a smooth hard metallic surface.

8. A hydrostatic bearing structure according to claim 6, wherein said other member has a thin layer of an elastomeric material disposed on a substrate of a heat conductive hard material arranged at least in the area adjacent said seal ring.

9. A hydrostatic bearing structure according to claim 6, wherein said heat conductive material is selected from the group including aluminum, copper and alloys thereof.

10. A hydrostatic bearing structure according to claim 6, wherein said elastomeric material is nitrile rubber.

* * * * *